(12) United States Patent
Brescoe

(10) Patent No.: US 11,524,361 B2
(45) Date of Patent: Dec. 13, 2022

(54) LASER WELDING METHOD

(71) Applicant: Coherent, Inc., Santa Clara, CA (US)

(72) Inventor: Ryan Brescoe, Windsor (CA)

(73) Assignee: Coherent, Inc., Santa Clara, CA (US)

( * ) Notice: Subject to any disclaimer, the term of this patent is extended or adjusted under 35 U.S.C. 154(b) by 292 days.

(21) Appl. No.: 16/881,886

(22) Filed: May 22, 2020

(65) Prior Publication Data

US 2021/0362271 A1    Nov. 25, 2021

(51) Int. Cl.
*B23K 26/244* (2014.01)
*B23K 26/0622* (2014.01)
(Continued)

(52) U.S. Cl.
CPC ........ *B23K 26/244* (2015.10); *B23K 26/0622* (2015.10); *B23K 26/0648* (2013.01); *B23K 26/0734* (2013.01); *B23K 2103/04* (2018.08)

(58) Field of Classification Search
CPC ............ B23K 26/0734; B23K 26/0613; B23K 26/38; B23K 26/0626; B23K 26/064; B23K 26/0608; B23K 26/0648; B23K 26/073; B23K 2103/04; B23K 26/0665; B23K 26/22; B23K 2103/06; B23K 2103/10; B23K 26/032; B23K 26/034; B23K 26/0604; B23K 26/067; B23K 26/082; B23K 26/21; B23K 26/244; B23K 26/32; B23K 1/0056; B23K 2103/05; B23K 2103/08; B23K 2103/12; B23K 2103/18; B23K 2103/26; B23K 2103/50; B23K 26/0096; B23K 26/048; B23K 26/06;
(Continued)

(56) References Cited

U.S. PATENT DOCUMENTS 6,311,099 B1    10/2001    Jasper et al.
9,482,821 B2    11/2016    Huber et al.
(Continued)

FOREIGN PATENT DOCUMENTS

JP           58-159514 A         9/1983
WO    WO-2016198724 A2 * 12/2016    ......... B23K 26/0096
(Continued)

OTHER PUBLICATIONS

International Search Report and Written Opinion received for PCT Patent Application No. PCT/US2020/017085, dated May 20, 2020, 10 pages.
(Continued)

*Primary Examiner* — Chris Q Liu
(74) *Attorney, Agent, or Firm* — Morrison & Foerster LLP

(57) ABSTRACT

A method for laser keyhole welding is disclosed to weld two pieces together made of a metal alloy. The method independently adjusts power in a focused center beam and power in a concentric focused annular beam. At the termination of a weld, the power of the annular beam is reduced, motion of the focused beams is stopped, the power of the center beam is increased, and the power of both beams is initially ramped down rapidly and then ramped down slowly. Increasing the power of the center beam equalizes the temperature of both pieces prior to solidification and cooling at the termination of the weld. An additional pulse of power may be applied to prevent the formation of defects or to erase any defects.

20 Claims, 8 Drawing Sheets

(51) Int. Cl.
*B23K 26/06* (2014.01)
*B23K 26/073* (2006.01)
*B23K 103/04* (2006.01)

(58) Field of Classification Search
CPC .............. B23K 26/062; B23K 26/0622; B23K 26/0643; B23K 26/0652; B23K 26/066; B23K 26/08; B23K 26/0869; B23K 26/144; B23K 26/1476; B23K 26/20; B23K 26/24; B23K 26/322; B23K 26/34; B23K 26/36; B23K 26/702; B23K 26/04; B23K 26/044; B23K 26/242; B23K 26/323
USPC .............. 219/121.85, 121.6, 121.63, 121.64, 219/121.65, 121.66, 121.61
See application file for complete search history.

(56) References Cited

U.S. PATENT DOCUMENTS

| | | | |
|---|---|---|---|
| 2012/0211474 A1* | 8/2012 | Hayashimoto | B23K 26/0665 219/121.64 |
| 2016/0016261 A1 | 1/2016 | Mudd | |
| 2018/0147661 A1* | 5/2018 | Salokatve | B23K 26/22 |
| 2018/0221989 A1* | 8/2018 | Matsuoka | B23K 26/0626 |
| 2019/0118299 A1* | 4/2019 | Kangastupa | B23K 26/322 |
| 2019/0383998 A1 | 12/2019 | Kangastupa | |
| 2020/0094350 A1* | 3/2020 | Pan | B23K 26/0876 |
| 2020/0254562 A1* | 8/2020 | Brescoe | B23K 26/0665 |
| 2020/0306878 A1 | 10/2020 | Kangastupa et al. | |
| 2021/0362271 A1 | 11/2021 | Brescoe | |

FOREIGN PATENT DOCUMENTS

| | | |
|---|---|---|
| WO | 2018/011456 A1 | 1/2018 |
| WO | WO-2019129917 A1 | 7/2019 |
| WO | WO-2020167588 A1 | 8/2020 |

OTHER PUBLICATIONS

Non-Final Office Action received for U.S. Appl. No. 16/786,623 dated Nov. 10, 2021, 12 pages.

Notice of Allowance received for U.S. Appl. No. 16/786,623 dated Apr. 15, 2022, 5 pages.

Notice of Allowance received for U.S. Appl. No. 16/786,623 dated Mar. 30, 2022, 8 pages.

International search report and written opinion received for International Patent Application No. PCT/US2021/031057, dated Oct. 4, 2021, 10 pages.

* cited by examiner

LASER WELDING METHOD

TECHNICAL FIELD OF THE INVENTION

The present invention relates in general to welding using focused beams of laser radiation. The invention relates in particular to welding metal alloys using a focused center beam and a focused annular beam.

DISCUSSION OF BACKGROUND ART

Beams of laser radiation are increasingly used for cutting, drilling, welding, marking, and scribing workpieces made of a wide range of materials; including metals and metal alloys. Traditional mechanical processing produces unwanted defects, such as micro-cracks that may propagate when a processed workpiece is stressed, thereby degrading and weakening the processed workpiece. Laser processing minimizes such unwanted defects, is generally cleaner, and causes a smaller heat-affected zone. Laser machining uses a focused laser beam to produce precise cuts and holes, having high-quality edges and walls, while minimizing the formation of unwanted defects.

In laser welding, a focused laser beam locates each weld spot or line precisely, while minimizing collateral heating. It is useful to distinguish two main laser welding regimes. Conduction welding occurs at lower laser powers and lower power densities. Absorbed laser power heats the irradiated material, melting material in each part to be joined, which flows, mixes, and then solidifies. Keyhole welding occurs at higher laser powers and higher power densities that are sufficient to vaporize some of the irradiated material. Pressure of the vaporized material on surrounding melted material opens a channel through the melted material, having a characteristic narrow and deep profile, which allows deep penetration of the laser beam. Finished keyhole welds are generally narrower, deeper, and stronger than conduction welds. However, it can be difficult to maintain a stable keyhole in a hot and dynamic pool of melted material.

One problem when laser welding some metals and metal alloys is the formation of defects, particularly cracks, at the termination of a line weld. Some defects are caused by stress that is induced while the workpiece is cooling. These initial defects weaken a welded workpiece and may further propagate if thermal or mechanical stress is applied when the finished workpiece is put to use. An unreliable weld in a structure could lead to catastrophic failure. One known solution to mitigate defects is to rapidly reduce the laser power at the termination of a weld, rather than switching off the power digitally. Another known solution is to rapidly lift the focused beam at the termination of a weld, thereby illuminating a progressively larger area on the workpiece with a progressively lower intensity beam.

Although these solutions have been successful for many materials, they have proven insufficient for modern high-strength metal alloys with relatively high thermal conductivity. These materials remain stubbornly prone to cracking at the beginning of a laser weld and, particularly, at the termination of a laser weld. A method for welding such materials is described in U.S. patent application Ser. No. 16/786,623, filed Feb. 10, 2020, assigned to the assignee of the present invention, the complete disclosure of which is incorporated herein by reference. The method uses a compound laser beam, having a center beam and a larger annular beam, which is focused onto the workpiece being welded. As the focused laser beam approaches the end of a line weld, the power of the annular beam is ramped down, while the power of the center beam is ramped up. The power of the center beam is then ramped down. While this method works well to prevent defects, the focused laser beam is moving across the surface of the workpiece during these power changes, producing a gradual taper in the width of the weld. This taper is typically a few millimeters long and is unacceptable in some applications that require a uniform cross section along the whole length of the weld. The very end of the weld can also taper in depth.

There is need for a simple and reliable process to produce welds having uniform cross sections in metals and metal alloys that are prone to cracking at the termination of a weld. In particular, to produce welds that maintain a minimum width along the whole length thereof. Preferably, the process would not compromise any of the advantages of laser welding, such as weld speed, precision, weld quality, and cost-per-weld.

SUMMARY OF THE INVENTION

A method for laser welding a workpiece along a weld line in accordance with the present invention comprises delivering a focused beam of laser radiation to the workpiece. The focused beam has a focused center beam and a concentric focused annular beam. The focused center beam is smaller than the focused annular beam on a surface of the workpiece exposed to the focused beam. The focused beam is moved laterally with respect to the workpiece along the weld line. The center beam has a center processing power and the annular beam has an annular processing power. The power of the annular beam is reduced from the annular processing power. The lateral movement of the focused beam with respect to the workpiece is stopped when the focused beam reaches an end location on the weld line. The power of the center beam is increased from the center processing power. The power of the annular beam is ramped down at a first annular ramp rate while the power of the center beam is ramped down at a first center ramp rate. The power of the annular beam is ramped down at a second annular ramp rate while the power of the center beam is ramped down at a second center ramp rate. The second annular ramp rate is less than the first annular ramp rate. The second center ramp rate is less than the first center ramp rate.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIGS. 2A and 2B together form a timing diagram for an embodiment of the laser welding method using the apparatus of FIGS. 1A and 1B.

FIGS. 3A and 3B together form a timing diagram for another embodiment of the laser welding method using the apparatus of FIGS. 1A and 1B.

FIGS. 4A and 4B together form a timing diagram for yet another embodiment of the laser welding method using the apparatus of FIGS. 1A and 1B.

DETAILED DESCRIPTION OF THE INVENTION

Figure 1A:
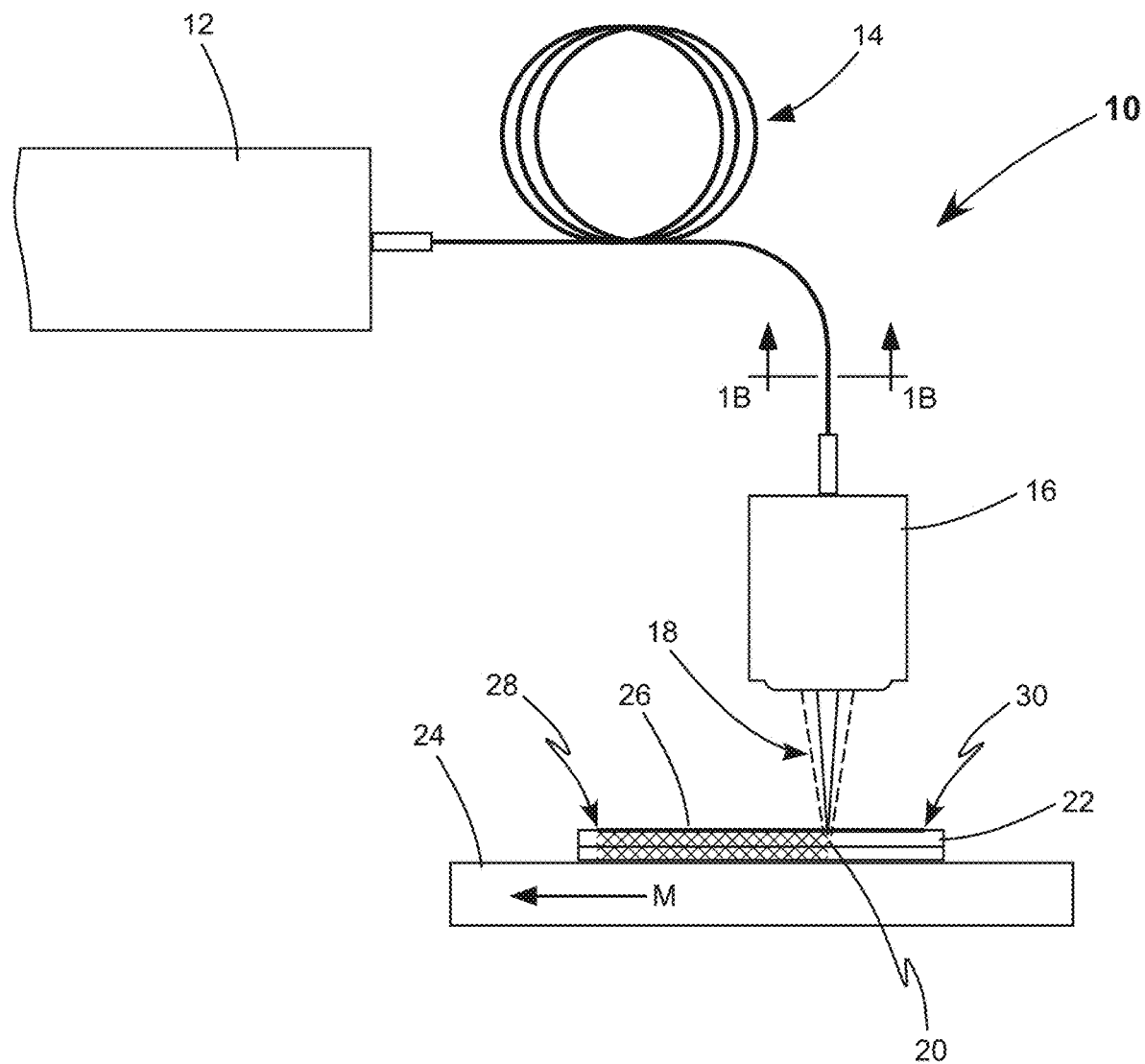
FIG. 1A is a side-view, partially in cross-section, schematically illustrating one preferred embodiment of apparatus for implementing a method for laser welding a workpiece in accordance with the present invention, the apparatus including a laser source generating at least two beams of laser radiation, an optical fiber, a focusing lens, and a means for translating the focused beams of laser radiation with respect to the workpiece.
Figure 1B:
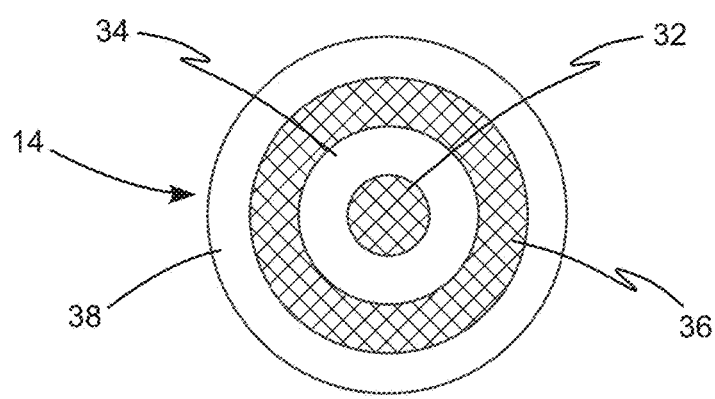
FIG. 1B is a cross-sectional view schematically illustrating details of the optical fiber of FIG. 1A, which has a center core for guiding a center beam and an annular core for guiding an annular beam.

Referring now to the drawings, wherein like components are designated by like numerals, FIGS. 1A and 1B schematically illustrate an apparatus 10 used in prior-art laser processing methods and in the laser welding method of the present invention. A laser source 12 delivers at least two beams of laser radiation through an optical fiber 14 to a focusing lens 16. Optical fiber 14 includes a center core 32 for guiding a center beam of laser radiation. Center core 32 has a low refractive index cladding 34. Optical fiber 14 further includes an annular core 36 for guiding an annular beam of laser radiation. Annular core 36 is concentrically located between low refractive index cladding 34 and another low refractive index cladding 38. Laser source 12 is configured to deliver the center beam to center core 32 and the annular beam to annular core 36. Laser systems integrating such a laser source with such an optical fiber are commercially available. For example, the Highlight™ FL-ARM laser from Coherent Inc. of Santa Clara, Calif. One feature of this particular laser system is that the powers of the center beam and annular beam can be adjusted independently and with high precision.

Focusing lens 16 forms a focused beam 18, comprising a focused center beam depicted as converging solid lines and a concentric focused annular beam depicted as converging dashed lines. The focused beams converge towards a focus 20, where the focused center beam has a smaller diameter than the concentric focused annular beam. Apparatus 10 may also include an optional beam expander, not depicted here, located between optical fiber 14 and focusing lens 16. Focusing lens 16 is depicted here as a fiber-coupled lens assembly, which are usually arranged to allow internal expansion of beams emerging from the optical fiber, prior to focusing.

Focused beam 18 is directed onto a workpiece 22, which initially comprises two pieces to be welded together, referred to here as the "top piece" and "bottom piece" for convenience of description. Terms such as "top" and "bottom" are not meant to imply specific spatial orientations of the workpiece. The two pieces of workpiece 22 may be coated or uncoated. The two pieces of workpiece 22 may be in direct contact or may be separated by a small gap. For example, zinc coated steel is commonly welded with a gap of up to a few hundred microns to allow high-pressure zinc vapor to escape. In the drawing, the two pieces are depicted in cross section during lap welding. Workpiece 22 is supported and moved by a translation stage 24. Focus 20 is depicted located close to a top surface of workpiece 22. The focus may be located above, on, or below the top surface. For lap welding, the focus is preferably at a depth of focus between about 1 millimeters (mm) above the surface and about 2 mm below the surface.

During welding, translation stage 24 is moved laterally, as indicated by vector M. The weld is depicted as hatching on workpiece 22 and is formed along a desired weld line 26 from a beginning location 28 to an end location 30. Laterally moving workpiece 22 moves focused beam 18 relative to workpiece 22 along weld line 26. Apparatus 10 may also be configured to move focusing lens 16 and thereby move focused beam 18 with respect to workpiece 22. Focusing lens 16 may be an assembly that incorporates galvanometer-actuated mirrors and a flat-field objective, for rapidly moving focused beam 18 laterally with respect to workpiece 22. It should be noted that although a flat workpiece is depicted, workpieces having other shapes can be welded using the inventive method. For example, molded sheet-metal parts used in automotive bodies often have complex three-dimensional shapes. Robots having multiple degrees-of-freedom can weld together molded sheet-metal parts along curvilinear weld lines.

Figures 2A, 2B:
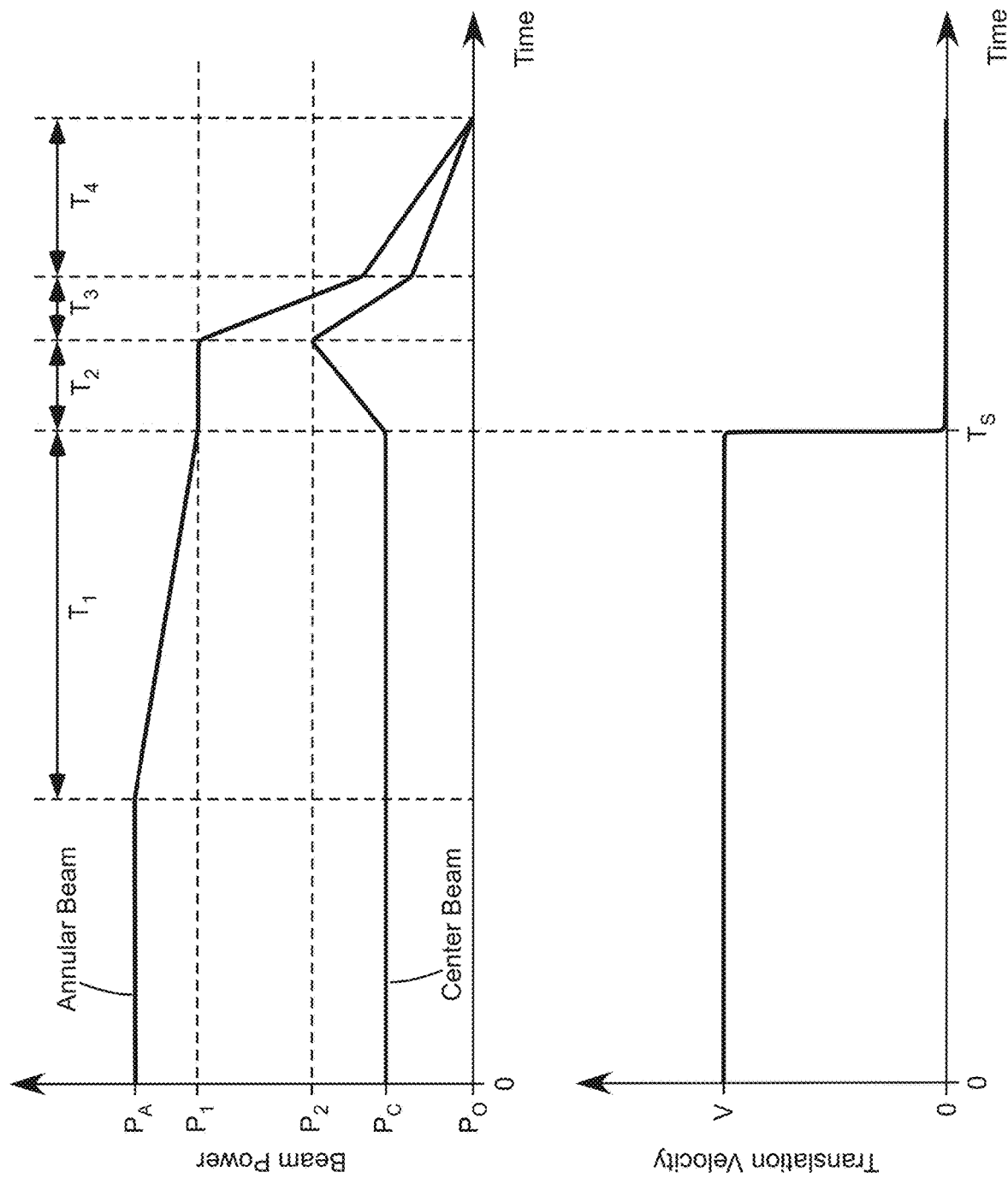
FIG. 2A is a graph of powers in the annular beam and the center beam vs. time.
FIG. 2B is a graph of translational velocity of the focuses beams vs. time.

FIGS. 2A and 2B together form a timing diagram schematically illustrating one preferred embodiment of a laser welding method 40 in accordance with the present invention using apparatus 10. FIG. 2A is a graph of power in the annular beam and power in the center beam as a function of time. FIG. 2B is a graph of lateral translation velocity of the focused beam with respect to the workpiece as a function of time. The timing diagram spans a temporal range that includes the end of linear welding and the termination of welding. At time 0 on the diagram, the focused beam is moving along weld line 26 at a constant velocity V between beginning location 28 and end location 30. For example, a constant velocity V that is between 15 and 135 millimeters per second (mm/s). At time $T_S$ the focused beam reaches the end location and stops.

Along most of the weld line there is "linear welding", with the center beam maintained at a center processing power $P_C$ and the annular beam maintained at an annular processing power $P_A$. These powers are selected to form a strong weld having a uniform width through the thickness of the workpiece. An optimum ratio of center processing power to annular processing power depends on the material composition of the workpiece. Nevertheless, it is straightforward to optimize this ratio empirically for a particular metal alloy, even if the composition is proprietary and therefore unknown. In general, for laser welding high-strength steel alloys, the inventors have determined that the optimum ratio $P_C:P_A$ is preferably less than 1:3 and most-preferably less than 1:8.

During a time $T_1$, as the focused beam approaches the end location, the power of the annular beam is reduced gradually from annular processing power $P_A$ to a lower power $P_1$. This gradual reduction in power eliminates a transverse crack that would otherwise propagate to the underside of the weld and be visible on the bottom surface of the welded workpiece. Increasing the rate at which the power of the annular beam is reduced moves this crack towards the end location, where it will be consumed during subsequent steps of the inventive method. However, reducing the annular power also changes the cross-sectional shape of the weld, as discussed below. It is therefore preferable to reduce the power at a minimum rate sufficient to reliably eliminate the unwanted transverse crack. At time $T_S$, the power of the annular beam is $P_1$, which is maintained through a time $T_2$.

During time $T_2$, with focused beam 18 now stationary at end location 30, the power of the center beam is increased from center processing power $P_C$ to a higher power $P_2$, delivering more laser power through the keyhole to the bottom side of the workpiece. During $T_2$ the weld on the top side of the workpiece is broadened due to irradiation by the stationary focused annular beam. This broadening is balanced by increasing the power of the center beam to broaden the weld on the bottom side of the workpiece. The increase in power thereby prevents the formation of a weld having an asymmetrical cross-section and undesirable asymmetrical mechanical stress that would weaken the weld.

During a time $T_3$, the power of the annular beam is ramped down at a first annular ramp rate and the power of the center beam is ramped down at a first center ramp rate. This ramping down during $T_3$ provides a controlled collapse of the keyhole and is essentially a transition to conduction welding conditions around the end location. Cooling and solidification of the melted material begins during time $T_3$. During a longer time $T_4$, the power of the annular beam is ramped down at a second annular ramp rate and the power of the center beam is ramped down at a second center ramp rate. The powers of these beams are ramped down more slowly during time $T_4$ than time $T_3$, to provide a slower and more controlled solidification of the remaining melted material. The second annular ramp rate is less than the first annular ramp rate and the second center ramp rate is less than the first center ramp rate.

Towards the end of $T_4$, the power densities in the focused annular beam and the focused center beam preferably converge to provide uniform heating of the surface of the workpiece. By the end of time $T_4$, the annular and center beams have been ramped down to an "off-power" $P_O$, which means a power that is too low to melt or damage an exposed area of the workpiece. For example, the off-power could be 0 watts (W).

The inventors have found that if the focused laser beam is simply switched off or even linearly reduced in power when it reaches the end location, solidification causes significant cracking. Without laser power delivered through a keyhole, solidification starts from the bottom of the weld pool. There is fast grain growth from the sides of the weld inwards towards the center, which concentrates stress along the center of the weld line. Cooling is accompanied by shrinkage of the material that tares the weld along the weld line. In some instances, the crack that is produced can propagate along the whole weld. High-strength steels are particularly prone to this cracking along the center of the weld line and additional cracks can form around the end location.

The inventive method prevents these defects by providing additional energy to the bottom piece through the keyhole during time $T_2$, so the top and bottom pieces are close in temperature to minimize interfacial cracks that propagate to the bottom surface. The welded workpiece has a characteristic "bulb" shape around end location 30 (visible in FIGS. 5A and 5B). A bulb begins forming during time $T_2$ while the focused beam is stationary. Controlling the solidification and cooling by ramping down the power through times $T_3$ and $T_4$ produces slower local grain growth that minimizes crack formation at the end location. Material at the end location solidifies and cools radially inward, which concentrates stress in a small volume at the center of the bulb, instead of the center of the weld line.

Figures 3A, 3B:
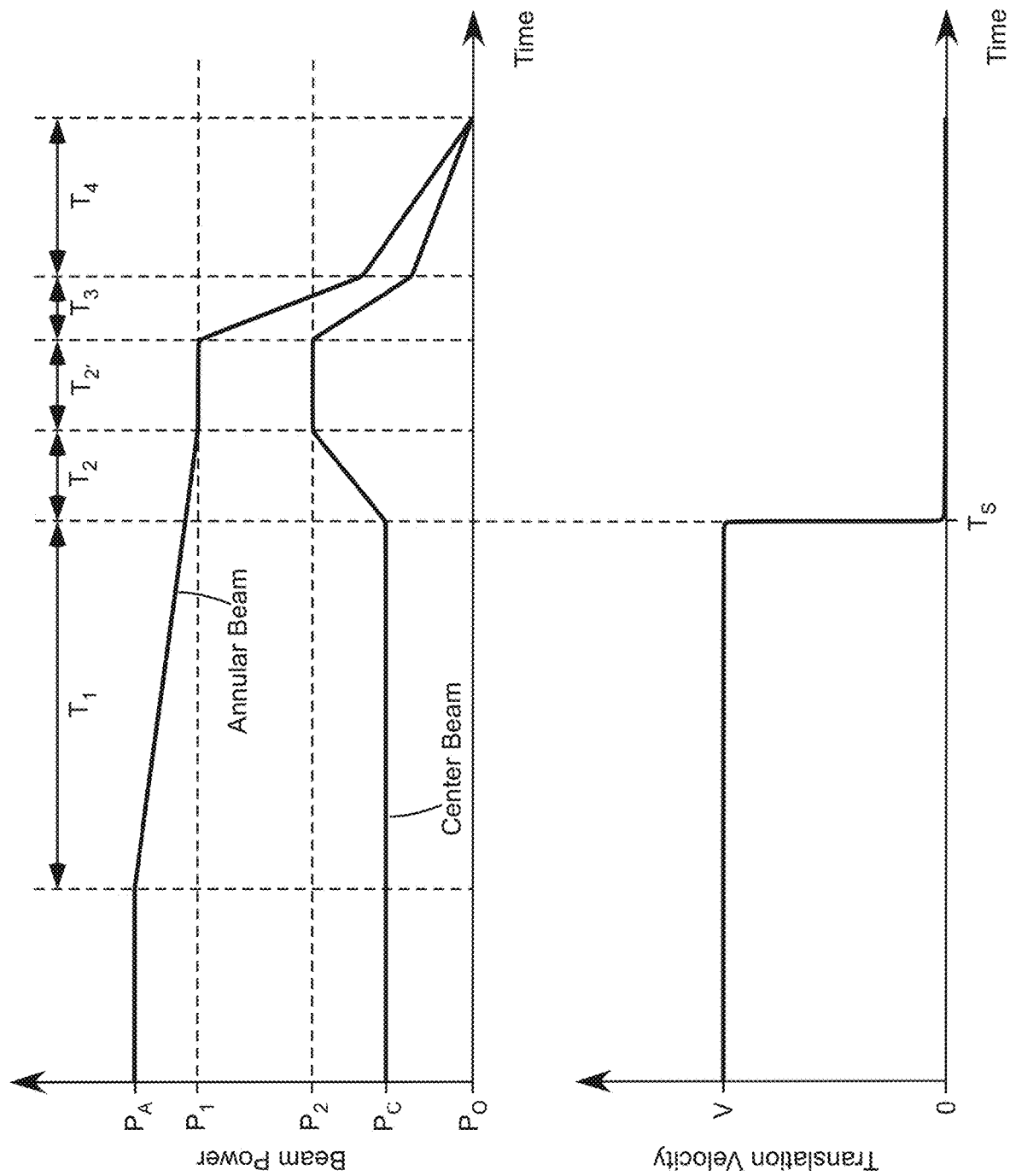
FIG. 3A is a graph of powers in the annular beam and the center beam vs. time.
FIG. 3B is a graph of translational velocity of the focused beams vs. time.

FIGS. 3A and 3B together form a timing diagram schematically illustrating another laser welding method 50 in accordance with the present invention. FIG. 3A is a graph of power in the annular beam and power in the center beam as a function of time. FIG. 3B is a graph of lateral translation velocity of the focused beam with respect to the workpiece as a function of time. Welding method 50 is similar to welding method 40 of FIGS. 2A and 2B, but further includes a dwell time $T_{2'}$ between times $T_2$ and $T_3$, during which the power of the annular beam is maintained at about $P_1$ and the power of the center beam is maintained at about $P_2$. During dwell time $T_{2'}$, additional energy is delivered through the keyhole by the focused center beam, which provides additional heating of the bottom piece to equalize the temperatures of the bottom piece and the top piece. The inventors found that this additional heating is favorable when welding some materials. Power $P_1$, power $P_2$, and dwell time $T_{2'}$ may be selected to form a weld at the end location that is symmetrical in cross section. In particular, the bulb is symmetrical about the interface between the top piece and bottom piece, as discussed further below. A dwell time $T_{2'}$ of tens of milliseconds (ms) is usually sufficient.

In welding method 50 of FIGS. 3A and 3B, the power of the annular beam is reduced from annular processing power $P_A$ to lower power $P_1$ over the total time $T_1$ and $T_2$. In welding method 40 of FIGS. 2A and 2B, the power of the annular beam is reduced to lower power $P_1$ over just time $T_1$. This difference between the welding methods is not critical because the reduction in power of the annular beam is gradual. For example, a reduction in power of between 10% and 20%, over the last few millimeters of the weld. Time $T_1$ will generally be much longer than time $T_2$.

Figures 4A, 4B:
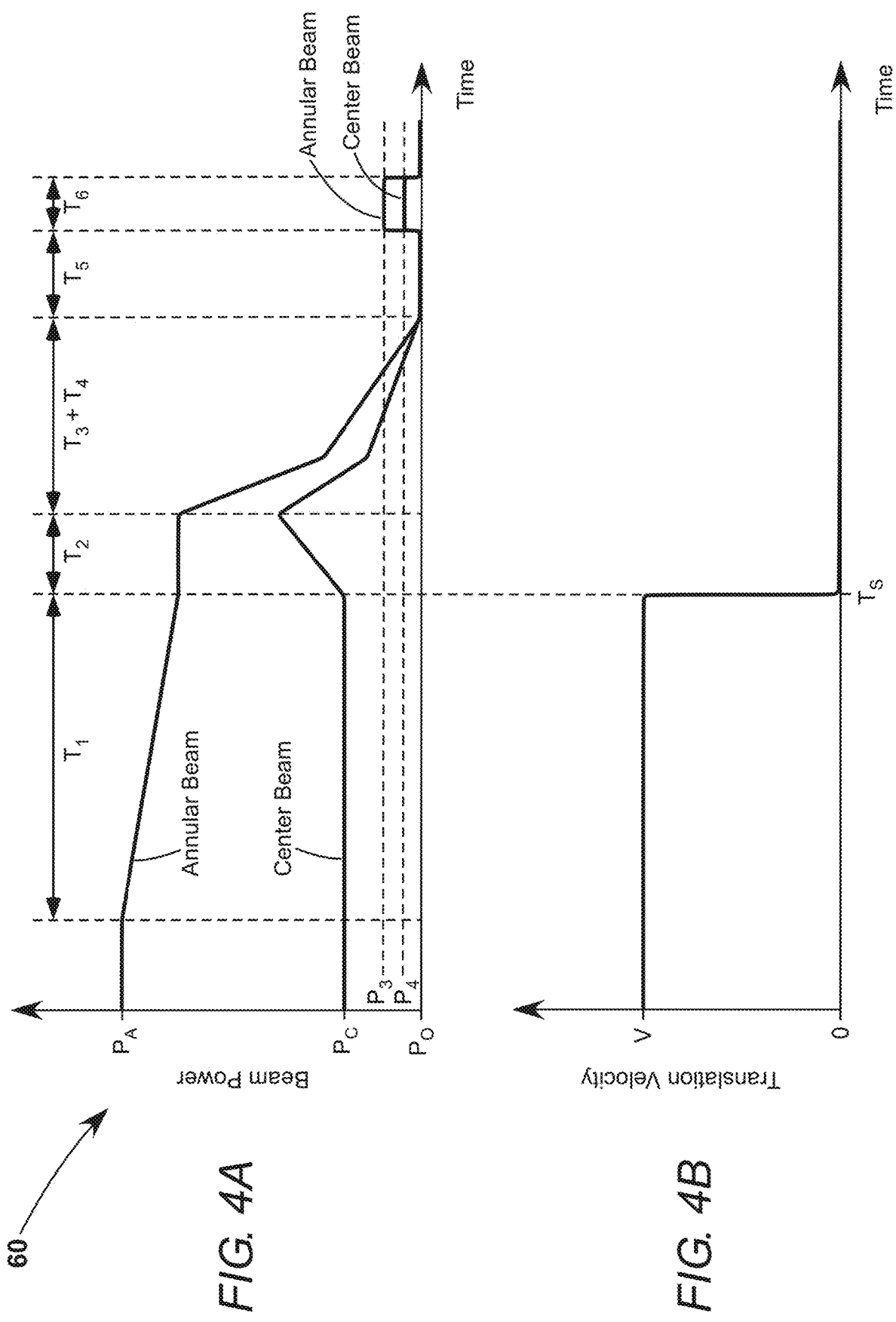
FIG. 4A is a graph of powers in the annular beam and the center beam vs. time.
FIG. 4B is a graph of translational velocity of the focused beams vs. time.

FIGS. 4A and 4B together form a timing diagram schematically illustrating yet another laser welding method 60 in accordance with the present invention. FIG. 4A is a graph of power in the annular beam and power in the center beam as a function of time. FIG. 4B is a graph of lateral translation velocity of the focused beam with respect to the workpiece as a function of time. Welding method 60 is similar to welding method 40 of FIGS. 2A and 2B, but includes an additional pulse of laser power, applied near the end of solidification of the weld pool.

After times $T_3$ and $T_4$, with the annular and center beams maintained at off-power $P_O$, any remaining melted material in the center of the bulb solidifies and cools. In some workpieces, a residual void can form near the top surface at the center of the bulb. In some workpieces, residual cracks form within the bulb. The additional pulse of laser power in welding method 60 prevents these defects from forming by further slowing and controlling solidification of the remaining melt pool. Alternatively, for a cooling workpiece that has just solidified, the additional pulse re-melts hot material at the top surface, erasing any residual void, residual cracks, or other defects.

In welding method 60, the annular and center beams are maintained at the off-power during a time $T_5$, following times $T_3$ and $T_4$, while the melt pool solidifies and diminishes in volume. Then the pulse of laser power is applied during a time $T_6$. The power of the annular beam $P_3$ during time $T_6$ is low compared to annular processing power $P_A$ and the power of the center beam $P_4$ during time $T_6$ is also low compared to center processing power $P_C$. The energy applied during time $T_6$ is, at most, sufficient for surface re-melting and the power density is preferably uniform. Therefore, power $P_4$ of the smaller focused center beam is generally less than power $P_3$ of the focused annular beam. Although a rectangular-shaped pulse is depicted in the drawing, other pulse shapes would be effective, provided the power and energy are sufficient to slow solidification or re-melt the surface. For some workpieces, it may be advantageous to apply multiple pulses to both slow solidification and re-melt the surface.

Figure 5A:
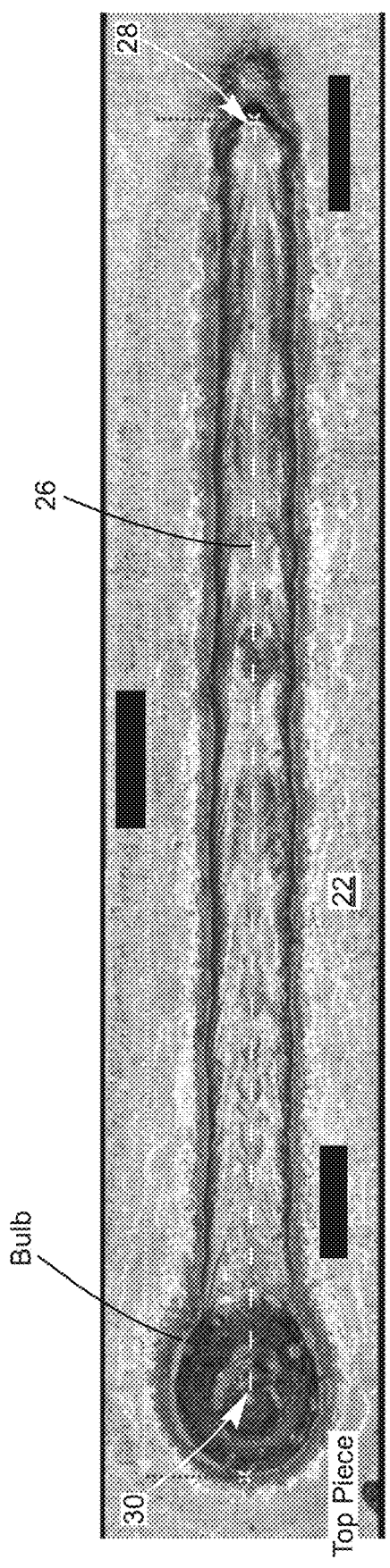
FIGS. 5A and 5B are magnified plan-views of a lap weld in a workpiece made of high-strength steel, showing respectively top and bottom surfaces of the workpiece, which was welded along a weld line in accordance with the present invention between a beginning location and an end location.
Figure 5B:
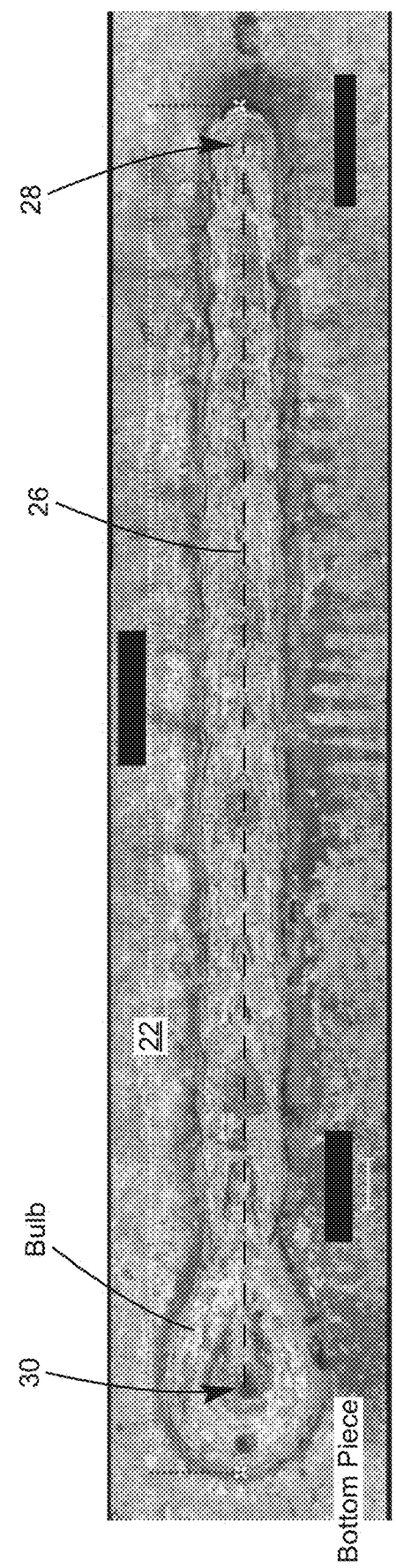

FIGS. 5A and 5B are plan-view magnified photographs showing a lap weld in a high-strength steel workpiece that was made using welding method 60 of FIGS. 4A and 4B, with the addition of a dwell time $T_{2'}$ as in method 50 of FIGS. 3A and 3B. The workpiece was two 1.4 mm thick pieces of galvanized Gen3 steel with a 0.3 mm gap therebetween. The laser system included a Highlight™ FL10000-ARM laser and a scanner mounted on a robot arm for translating the focused beam. Prior to time $T_S$, the focused beam was translated at a velocity of 46 mm/s along the weld line, with an annular processing power $P_A$ of 3800 W and a center processing power $P_C$ of 1000 W. The other welding parameters were: $P_1$=3500 W, $P_2$=1600 W, $P_3$=200 W, $P_4$=50 W, $T_1$=100 ms, $T_2$=5 ms, $T_{2'}$=50 ms, $T_3$=60 ms, $T_4$=160 ms, $T_5$=70 ms, and $T_6$=30 ms.

FIG. 5A shows the top surface, which was exposed to the focused laser beam, and FIG. 5B shows the bottom surface. The focused beam was scanned from right to left along weld line 26, from beginning location 28 to end location 30. The weld has about uniform surface width along most of the weld line, which is approximately the diameter of the focused annular beam. The weld has a bulb around the end location, as discussed above. There are no cracks on the surfaces of this weld. The weld line is dashed in the drawings, so as not to obscure any cracking along the center of the weld.

Figure 6A:
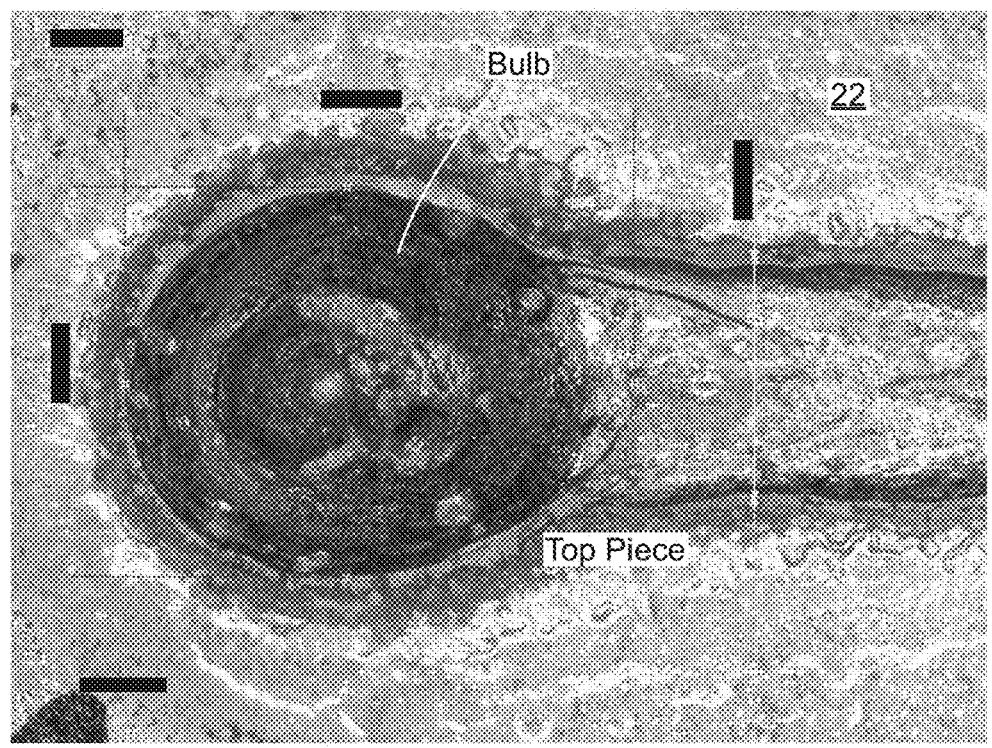
FIGS. 6A and 6B are further-magnified plan-views of the lap weld in FIGS. 5A and 5B, showing particularly the surfaces around the end location.
Figure 6B:
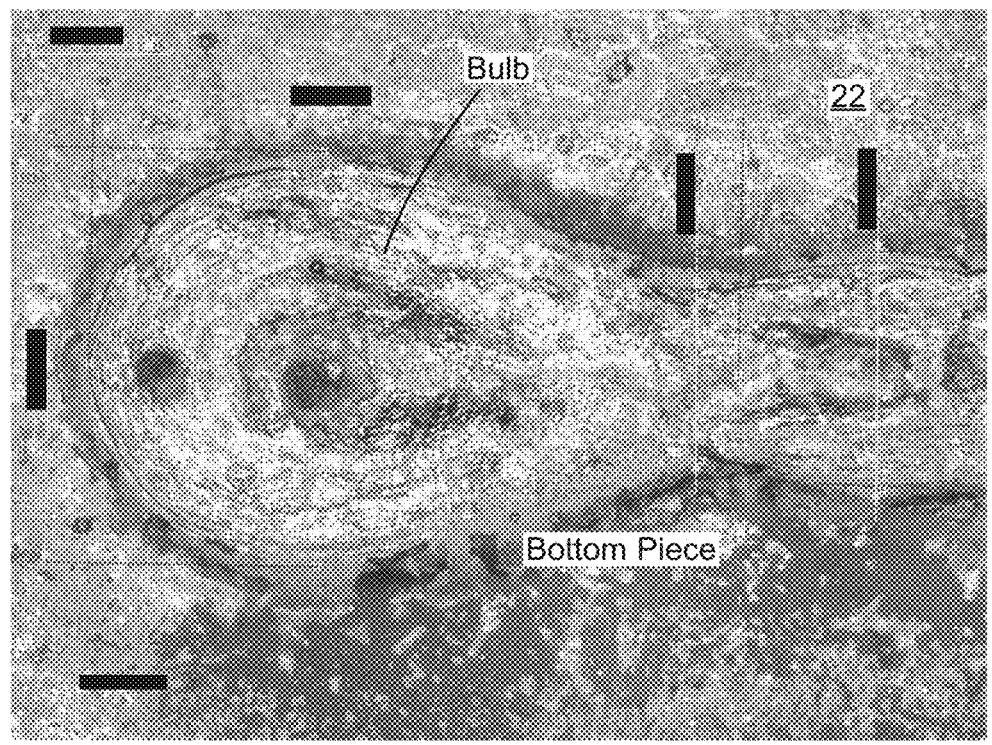

FIGS. 6A and 6B are higher-magnification photographs of the workpiece of FIGS. 5A and 5B around the bulb. FIG. 6A shows the top surface and FIG. 6B shows the bottom surface. There are no cracks apparent along the center line or within the bulb. There are no pronounced cavities or other defects near the center of the bulb.

Figure 7A:
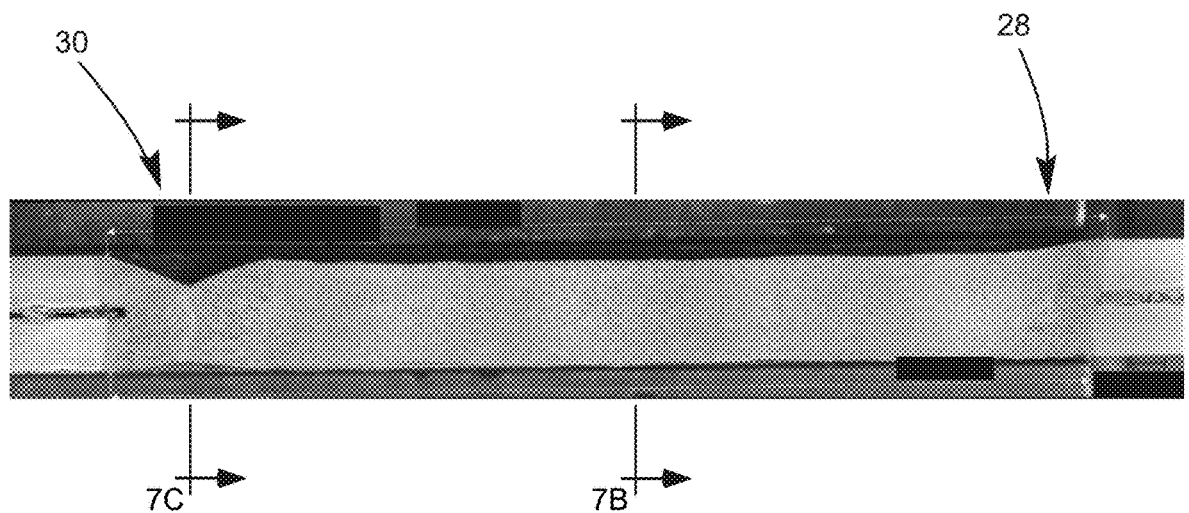
FIG. 7A is a side-view cross-section of the lap weld in FIGS. 5A and 5B.
Figure 7B:
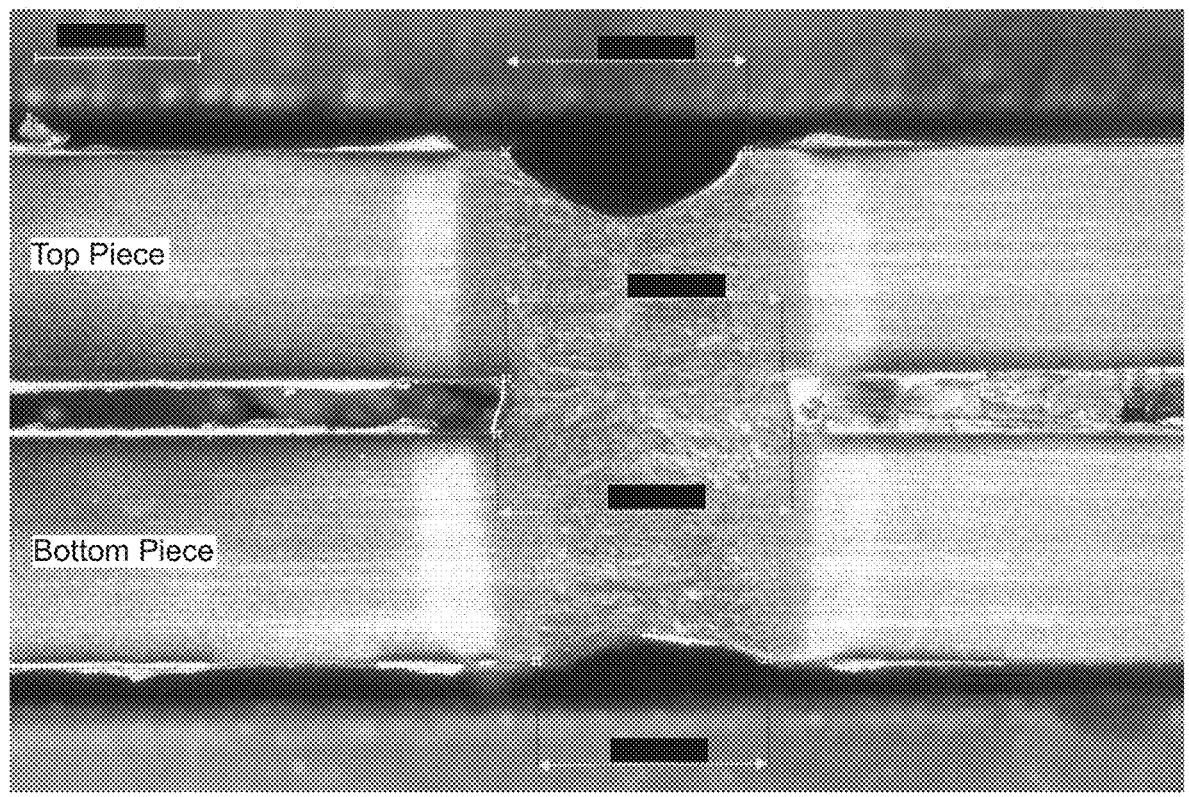
FIG. 7B is an end-view cross-section of the lap weld in FIGS. 5A and 5B, about midway between the beginning location and the end location.
Figure 7C:
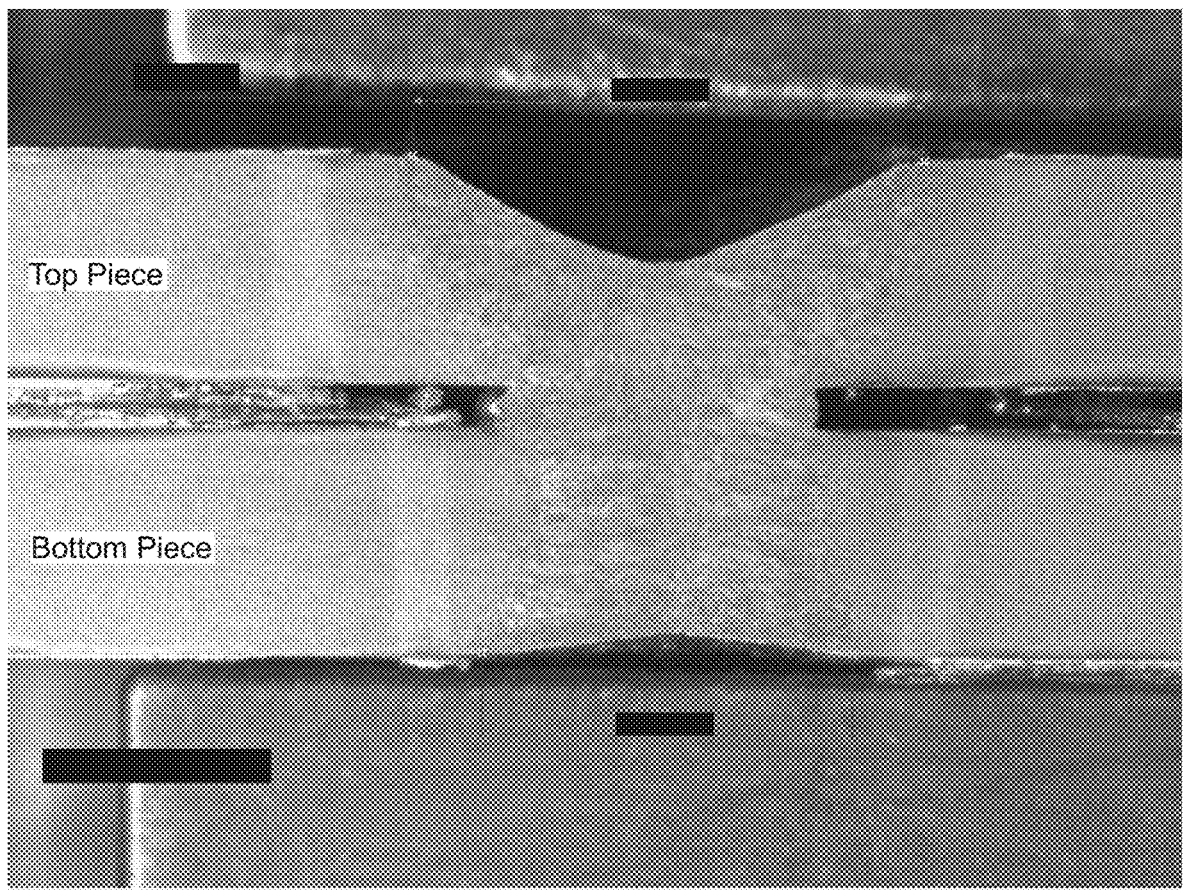
FIG. 7C is an end-view cross-section of the lap weld in FIGS. 5A and 5B, at the end location.

FIGS. 7A-7C are cross-sectional magnified photographs of the workpiece of FIGS. 5A and 5B. FIG. 7A shows the weld along the whole weld line from beginning location 28 to end location 30. The weld has about uniform height along most of the weld line and has no apparent discontinuities, cracks, or voids. The weld tapers slightly around end location 30, as discussed below.

FIG. 7B shows the weld in cross section at a location about midway between the beginning location and the end location. This location was exposed to the focused beam prior to time $T_1$, while the center beam was at center processing power $P_C$ and the annular beam was at annular processing power $P_A$. The weld has about uniform width through the workpiece or (equivalently) the weld has relatively flat walls, as desired. This means the weld is symmetrical about the interface between the two pieces. The weld has a meniscus in the top and bottom surfaces, which is typical of lap welding across a gap when not using a filler material.

FIG. 7C shows the weld in cross section at the end location. The weld extends through the full thickness of the workpiece. Overall, the weld has symmetry between the top piece and bottom piece, with about the same amount of material melted in each piece. This symmetry produces a cross-sectional "butterfly" or "hourglass" shape at the end location. The waist located at the interface between the two pieces has about the same width (~1.8 mm) as the rest of the weld (~1.6 mm, represented by the cross section in FIG. 7B), so the termination of the weld is not a point of weakness in the welded workpiece. There are no apparent cracks or voids at the end location. The bulb diameter is about 3.1 mm as measured on the top surface in this cross section.

The inventive welding method can be applied to a variety of metal alloys. For example, high-strength steel alloys "Gen3" and "XGen3", which are third-generation steels as known in the art. The method can also be applied to dual-phase steels, such as "DP600" and "DP980". The method can also be applied to Usibor® and Ductibor® branded steels, which are commercially available from ArcelorMittal S.A. of Luxembourg, Luxembourg.

Although lap welding was used as an example above, one of skill in the art would recognize that the inventive method could be applied to other configurations, such as fillet welding or butt welding. For applications that do not require welding through the full thickness of a workpiece, the method still regulates heating and then controls solidification and cooling at the bottom of the weld, which corresponds to the deepest penetration of the keyhole into the workpiece. The method would still mitigate crack formation and still form a characteristic bulb at the termination of the weld. By using an optimal ratio of center processing power to annular processing power $P_C$:$P_A$, a weld would be formed having about uniform width between the exposed surface and the bottom of the weld along most of the weld line.

Although linear power ramping was shown and discussed herein, for simplicity of illustration and description, the inventive welding method could be further optimized by using other types of power ramping of the center beam and/or annular beam. For example, exponential power ramping.

The present invention is described above in terms of a preferred embodiment and other embodiments. The invention is not limited, however, to the embodiments described and depicted herein. Rather, the invention is limited only by the claims appended hereto.

What is claimed is:

1. A method for laser welding a workpiece along a weld line, comprising steps of:

delivering a focused beam of laser radiation to the workpiece, the focused beam having a focused center beam and a concentric focused annular beam, the focused center beam being smaller than the focused annular beam on a surface of the workpiece exposed to the focused beam;

moving the focused beam laterally with respect to the workpiece along the weld line, the focused center beam having a center processing power and the focused annular beam having an annular processing power;

reducing power of the focused annular beam from the annular processing power to a lower power;

stopping the lateral movement of the focused beam with respect to the workpiece when the focused beam reaches an end location on the weld line;

thereafter, increasing power of the focused center beam from the center processing power to a higher power;

thereafter, ramping down power of the focused annular beam at a first annular ramp rate while ramping down power of the focused center beam at a first center ramp rate; and thereafter, ramping down power of the focused annular beam at a second annular ramp rate while ramping down power of the focused center beam at a second center ramp rate, the second annular ramp rate being less than the first annular ramp rate, and the second center ramp rate being less than the first center ramp rate.

2. The laser welding method of claim 1, wherein the laser radiation is delivered from a laser source to a focusing lens by an optical fiber, the focusing lens forming the focused beam.

3. The laser welding method of claim 2, wherein the optical fiber includes a center core for guiding the focused center beam and an annular core for guiding the focused annular beam.

4. The laser welding method of claim 1, wherein the workpiece includes two pieces to be lap welded together.

5. The laser welding method of claim 4, wherein the two pieces are separated by a gap.

6. The laser welding method of claim 4, wherein a ratio of center processing power to annular processing power is selected to form a weld having a uniform width through the two pieces.

7. The laser welding method of claim 1, wherein a ratio of center processing power to annular processing power is less than 1:3.

8. The laser welding method of claim 1, wherein a focus of the focused beam is located at a depth of focus with respect to the exposed surface of the workpiece that is in a range between 1 millimeter above the exposed surface and 2 millimeters below the exposed surface.

9. The laser welding method of claim 1, wherein the step of ramping down the power of the focused annular beam at a second annular rate and ramping down the power of the focused center beam a second center rate, ramps down the powers of the focused annular beam and the focused center beam to an off-power.

10. The laser welding method of claim 9, wherein the off-power is 0 watts.

11. The laser welding method of claim 9, wherein the off-power is less than a power to melt a surface of the workpiece.

12. The laser welding method of claim 1, wherein the lower power and the higher power are then maintained for a dwell time before the steps of ramping down power of the focused annular beam and ramping down power of the focused center beam.

13. The laser welding method of claim 12, wherein the workpiece includes two pieces to be welded together, and the lower power, the higher power, and the dwell time are selected to equalize temperatures of the two pieces at the end location.

14. The laser welding method of claim 12, wherein the lower power, the higher power, and the dwell time are selected to equalize temperatures on the exposed surface and at a deepest penetration of a keyhole into the workpiece.

15. The laser welding method of claim 12, wherein the lower power, the higher power, and the dwell time are selected to form a weld that is symmetric in cross section at the end location.

16. The laser welding method of claim 12, wherein the reduction in power of the focused annular beam from the annular processing power to the lower power is between about 10% and 20%.

17. The laser welding method of claim 1, further including a step of applying a pulse of laser power after the steps of ramping down power of the focused annular beam and ramping down power of the focused center beam.

18. The laser welding method of claim 17, wherein the laser power provided by the pulse is sufficient to slow solidification of melted material at the end location.

19. The laser welding method of claim 17, wherein the laser power provided by the pulse is sufficient to re-melt the exposed surface.

20. The laser welding method of claim 1, wherein the workpiece is made of a metal alloy selected from a group consisting of Gen3 steel, XGen3 steel, DP600 steel, and DP980 steel.

* * * * *